(12) United States Patent
Barnhart

(10) Patent No.: US 7,478,498 B1
(45) Date of Patent: Jan. 20, 2009

(54) TANGLE FREE FISHING BOBBER SYSTEM

(76) Inventor: Garry L. Barnhart, 210 Autumn Hill Dr., Cranberry Township, PA (US) 16066

(*) Notice: Subject to any disclaimer, the term of this patent is extended or adjusted under 35 U.S.C. 154(b) by 17 days.

(21) Appl. No.: 11/378,844

(22) Filed: Mar. 17, 2006

Related U.S. Application Data

(60) Provisional application No. 60/664,995, filed on Mar. 24, 2005.

(51) Int. Cl.
*A01K 97/12* (2006.01)
(52) U.S. Cl. .......................................................... 43/17
(58) Field of Classification Search ................ 43/17
See application file for complete search history.

(56) References Cited

U.S. PATENT DOCUMENTS

| | | | |
|---|---|---|---|
| 2,283,779 A * | 5/1942 | Gano | 43/18.1 R |
| 2,547,308 A * | 4/1951 | Dean | 43/17 |
| 3,023,532 A * | 3/1962 | Gorenty | 43/17 |
| 3,744,172 A * | 7/1973 | Kelli | 43/17 |
| 3,881,270 A * | 5/1975 | Olcott | 43/17 |
| 4,125,957 A * | 11/1978 | Cunningham | 43/17 |
| 4,552,318 A * | 11/1985 | Durham | 242/323 |
| 4,702,031 A * | 10/1987 | Sousa | 43/17 |
| 4,939,864 A * | 7/1990 | Bowles | 43/17 |
| 5,228,228 A | 7/1993 | Meissner | |
| 5,236,232 A | 8/1993 | Broberg | |
| 5,450,687 A * | 9/1995 | Fox | 43/17 |
| 5,490,348 A | 2/1996 | Serba | |
| 5,515,639 A * | 5/1996 | Phipps | 43/17 |
| 5,669,175 A * | 9/1997 | Phipps | 43/17 |
| 5,682,703 A * | 11/1997 | Corbiere | 43/17 |
| 5,735,073 A | 4/1998 | Kuhlman | |
| 5,884,429 A * | 3/1999 | Cube | 43/17 |
| 6,101,757 A * | 8/2000 | Draghici | 43/17 |
| 6,158,163 A * | 12/2000 | Fox | 43/43.13 |
| 6,158,164 A | 12/2000 | Mack et al. | |
| 6,308,452 B1 * | 10/2001 | Fox | 43/17 |
| 6,370,808 B1 | 4/2002 | D'Alessandro | |
| 6,519,894 B1 | 2/2003 | Geary | |
| 6,691,450 B2 | 2/2004 | Glavinich | |
| 2004/0088899 A1 * | 5/2004 | Altrich et al. | 43/17 |
| 2007/0068062 A1 * | 3/2007 | Zeglen | 43/17 |

* cited by examiner

*Primary Examiner*—Kurt Rowan
(74) *Attorney, Agent, or Firm*—Robert C. Montgomery

(57) ABSTRACT

A system and device for the easy and reliable detection of a strike on a fishing line and prevention of line entanglement is herein described. A bobber is placed on a conventional fishing line, which is suspended from a clamp that is removably attached to a conventional fishing pole. Affixed to the clamp is a shield portion, which functions as a device to eliminate any line entanglement or accidental rotation of the bobber around the pole. An alternate embodiment of the present invention provides additional visibility, comprising a bobber displaying fluorescent means.

4 Claims, 5 Drawing Sheets

TANGLE FREE FISHING BOBBER SYSTEM

RELATED APPLICATIONS

The present invention was first described in U.S. Provisional Patent Application No. 60/664,995, filed on Mar. 24, 2005. There are no previously filed, nor are there currently any co-pending, applications anywhere in the world.

FIELD OF THE INVENTION

The present invention relates generally to a unique bobber design with fluorescent night visibility means for fishing poles that indicates strikes when bottom fishing and, more particularly, to a stringing system incorporating the bobber that significantly reduces the tangling of lines.

BACKGROUND OF THE INVENTION

The technology used by anglers to catch fish has become increasingly complex in nature. Fishermen no longer rely on the traditional hook and worm approach to attract their game. Instead, a broad range of products has hit the market, designed to aid the fisherman to quickly catch more fish. One type of fishing popular with many fisherman is that of bottom fishing in lakes, dams or ponds. In this type of fishing, no floating bobber is used since the hook and bait lie on the bottom. To aid in seeing if line is being paid out indicating a possible strike, many fishermen attach a bobber to the line along the pole. However, this often leads to tangled lines since the bobber can flip over the pole and quickly become tangled. Accordingly, there is a need for a means by which possible strikes can be indicated when bottom fishing without the disadvantages listed above.

Several attempts have been made in the past to alert those who fish, of strikes while bottom fishing. U.S. Pat. No. 6,691,450 in the name of Glavinich discloses a fishing line sinker assemblage including a streamlined weighted body and a securement member telescopically attached to the weighted body. The use of the Glavinich invention involves the use of a wire securement member which may become tangled or twisted while in use.

U.S. Pat. No. 6,519,894 issued in the name of Geary provides a fishing line with a hook member at its distal end, and a weighted member disposed along a fishing line between stopper members. This invention provides for an assembly instead of a simple retrofit device as disclosed within this application. Also, the Geary design doesn't provide for readily visible strike detection.

U.S. Pat. No. 6,370,808 issued in the name of D'Alessandro describes a completely new device and method for preventing entanglement of the line guide of a fishing rod. The device consists of a new device and involves additional training to be learned which is not an inherent feature of the current invention.

U.S. Pat. No. 6,158,164 issued in the name of Mack et al. discloses an aerodynamically weighted fishing bobber. This device consists of two disparate portions for attachment to a fishing line and is particularly suited to farther casting distances and floating on top of the water. It does not assist in bottom surface fishing and any strikes must be viewed during daylight hours.

U.S. Pat. No. 5,735,073 issued in the name of Kuhlman describes a fish bite indicator for mounting on a fishing rod. More specifically, it consists of a bobber with attachment means to a fishing line, a second flexible loop for sensing a fish strike and an indicating means. This device differs from the present invention in that it involves stringing multiple lines onto a fishing rod and does not have a means of viewing a fish strike at night.

U.S. Pat. No. 5,490,348 issued in the name of Serba describes a two-part slip bobber such that the bobber can upright itself. Again, as in other inventions in the prior art, the Serba invention is designed to float on top of the water, which is difficult to detect when fishing in reduced lighting.

Another fish bite detector mounted onto a fishing rod is disclosed in U.S. Pat. No. 5,228,228 issued in the name of Meissner. The Meissner invention consists of a bite detector housing with a motion detection means in electrical contact with a visual and/or audible signaling means. Whenever vibration or motion occurs, the device alerts the user through the signaling means. The present invention is considerably easier to manufacture, produce and operate and does not have any complicated electrical components to maintain and service; a decided disadvantage to the Meissner invention.

None of the prior art particularly describes a lighting apparatus suitable for mounting underneath cabinetry or locations of low clearances or limited natural illumination that is simple in configuration and provides easy installation. Accordingly, there is a need for a lighting apparatus suitable for mounting underneath cabinetry or locations of low clearance and/or limited natural illumination in a fast, easy, consistent, reliable and efficient manner.

SUMMARY OF THE INVENTION

As its name implies, the invention is a bobber system for fishing poles which indicates strikes when fishing off of the bottom of dams, ponds or lakes. Upon initial observation of the invention, it looks like a conventional bobber that one would attach to fishing line along the pole to help indicate when line was being paid out and a possible strike is occurring. However, after closer inspection, it can be seen that the bobber is suspended from two metal chains attached to a clear plastic circular shield. The clear shield prevents the bobber from flipping around the pole and becoming tangled. For additional visibility, a piece of iridescent tape is also attached to the invention and is allowed to trail or hang below. Finally, the invention has a quick release mechanism allowing it to be attached or removed quickly. The use of the invention allows fishermen the ability to quickly and easily detect a strike when bottom fishing, while and at the same time ensuring that tangling of the line by the bobber will not occur.

It has been further observed that there is a need for a fishing system that can indicate the strike in the night during bottom fishing.

It has also been observed that there is a need for a bobber that remains tangle-free whenever there is strike at the bottom.

Therefore, the object of the invention is to provide a fishing system that can quickly and easily detect a strike during bottom fishing, even in the night.

It is a further object of the invention to provide a fishing system with a bobber that remains tangle-free.

To achieve the above and other objectives, the present invention provides a tangle-free fishing bobber system comprising a bobber impregnated with light-emitting material suspended from a fishing line by means of a chain of a lightweight, resilient and non-corrosive material to secure the bobber on the line during stress at the time of fishing; and a shield to prevent the line entanglement during fishing.

The present invention in particular, provides a bobber system for fishing poles which indicates strikes when fishing off of the bottom of dams, ponds or lakes. The invention differs from conventional bobbers in that the bobber is suspended from two metal chains attached to a clear plastic circular shield. The clear shield prevents the bobber from flipping around the pole and becoming tangled. For additional visibility, a piece of iridescent tape is also attached to the invention and is allowed to trail or hang below. Finally, the invention has a quick release mechanism allowing it to be attached or removed quickly.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | bobber system |
| 15 | illumination |
| 20 | bobber |
| 21 | fishing line guide hole |
| 30 | chain |
| 31 | chain guide hole |
| 40 | shield |
| 41 | slit |
| 45 | clamp bottom |
| 50 | clamp |
| 51 | clamp channel |
| 55 | clamp tab |
| 60 | conventional fishing pole |
| 70 | conventional fishing line |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible, without deviating from the basic concept of the invention. Any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
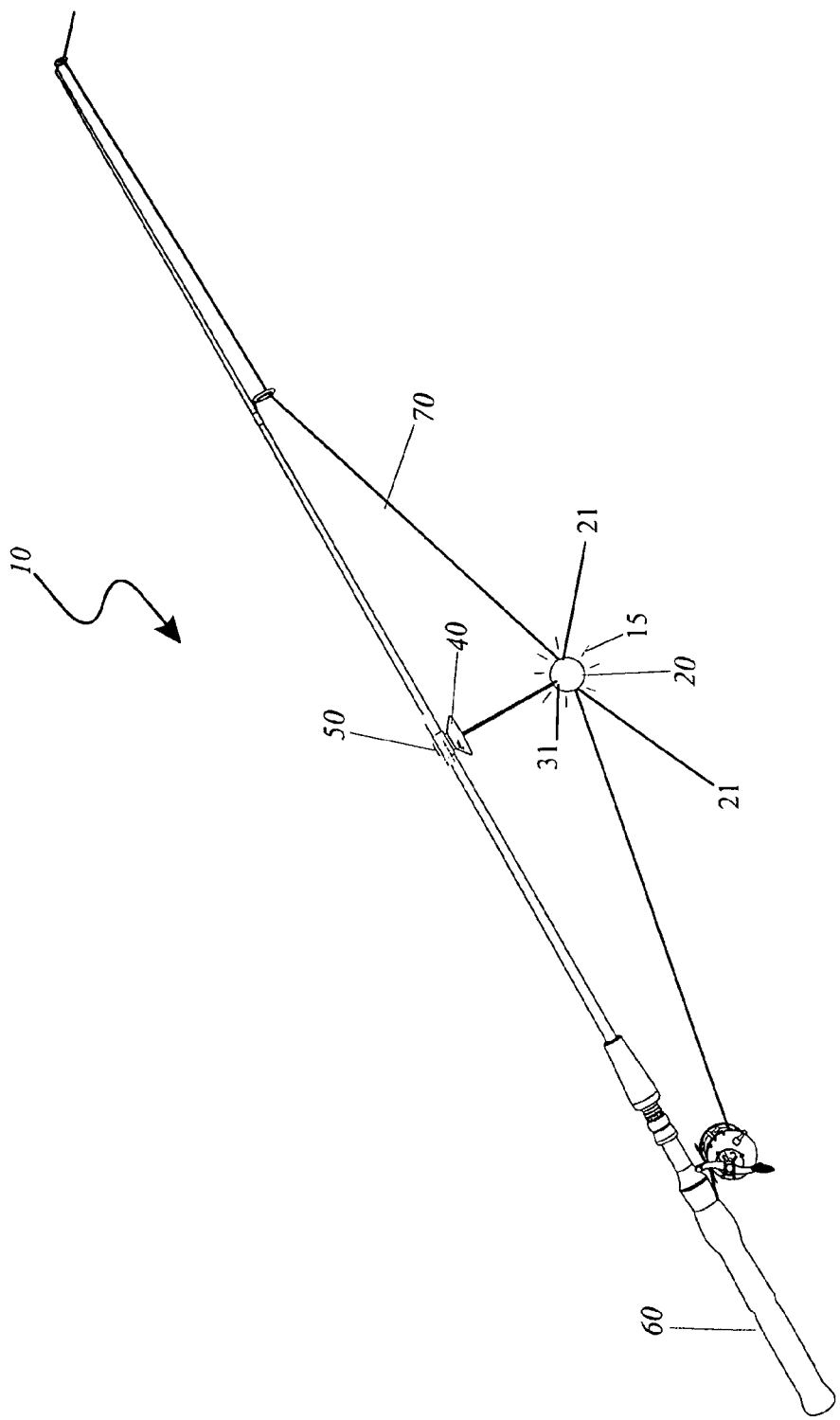
FIG. 1 is an environmental perspective view of a bobber system for fishing poles 10, with the invention attached to a fishing pole 60, according to a preferred embodiment of the present invention.

Referring now to FIG. 1, an environmental perspective view of a bobber system for fishing poles 10 (herein described as the "system") is disclosed in accordance with the preferred embodiment of the present invention. A conventional fishing pole 60 (herein described as "pole") is outfitted with the system 10 described below. The system 10 is designed to be an attachment or add-on device and consists of a bobber 20, chain assembly 30 (herein described as "chain"), shield 40 and clamping mechanism 50. The bobber 20 is designed for releasable attachment from a conventional fishing line 70 (herein described as the "line") and is located between the first and second eyelet of a pole 60. Guide holes 21 on the bobber 20 allow line 70 to be threaded therethrough. The bobber 20 is fabricated out of a very sensitive and lightweight material; an alternative embodiment anticipates the use of fluorescent material or other light-emitting materials providing illumination 15 either impregnated into the bobber 20 or as an additive. The use of the bobber 20 and its anticipated alternate embodiments enable the user to detect a catch on the line 70 for enhanced night visibility. A clamp 50 is described as a device to removably secure the bobber 20 onto the pole 60 and comprises any type of clamping mechanism; herein illustrated as a preferred mechanism is a "C"-type clamp 50 with bifurcated opposing arms defining a pole guide 51 therebetween and a clamping tab 55 for manual adjustment of the clamp 55 onto a pole 60. The preferred clamp 50 may be attached also by forcing the pole 70 into the pole guide 51 until the bifurcated clamp arms "snap" back; consequently, this clamp 50 is preferably manufactured out of resilient, yet maneuverable material, such as polyethylene. The clamp 50 is situated equidistant from two (2) eyelets on the pole 60. A chain 30 affixed from the distal end of the clamp 50 connects the bobber 20 to the clamp 50. The chain 30 is either a one-piece unit that is fed through a chain guide hole 21 on the bobber 20 located on the portion nearest the shield 40 or two (2) separate pieces with each individually affixed at their distal end to a location on the bobber 20 that faces the shield 40. Preferably, and for the purposes of illustration, but by no means limited to, each chain 30 is affixed to the shield 40 by forcing the opposite end portion of the chain 20 through a slit 41 on opposite lower ends of the shield 40 for both the one-piece and two-piece design. The chain 30 is made out of a lightweight, resilient, and non-corrosive material that can reliably secure the bobber 20 on the line 70 during any reasonable stress during the act of fishing. A shield portion 40 is provided, which is removably attached to the bottom end 45 of the clamp 50, via friction fitting of the shield 40 about the bottom end 45 of the clamp 50.

The shield 40 is preferably fabricated out of a clear and lightweight material and is flared at its bottom end, which is defined as the end facing the bobber 20, with the outer circumference width being minimally larger than that of the bobber 20 and the inner circumference matching that of the bottom end 45 of the clamp 50, with which it engages. The purpose of the shield 40 is to prevent line 70 entanglement around the rod 60 and the interruption of the process of reeling the line 70.

Figure 2:
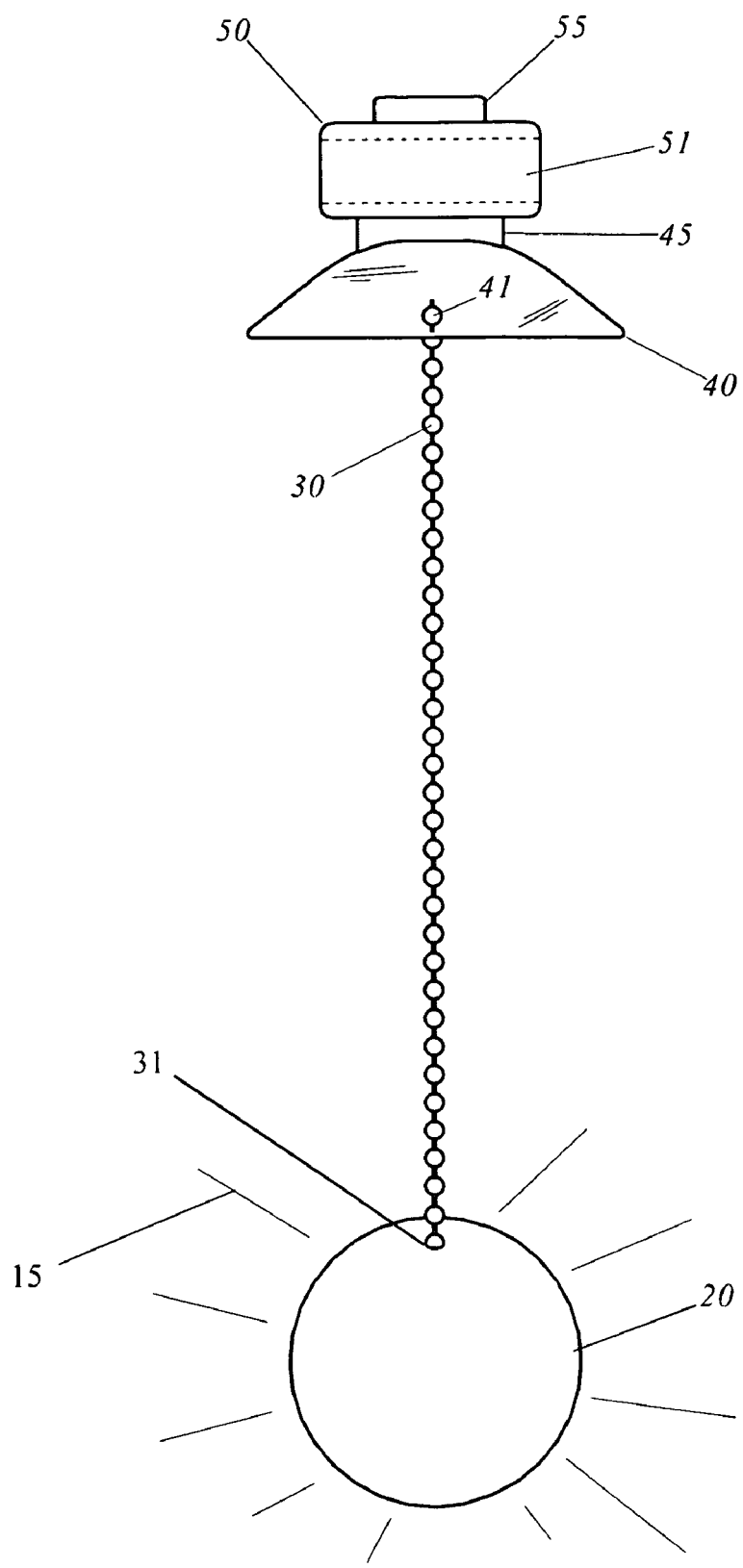
FIG. 2 is a front view of a bobber system for fishing poles 10, according to a preferred embodiment of the present invention; and, FIG. 3 is a bottom view of the bobber system for fishing poles 10, according to a preferred embodiment of the present invention; and, FIG. 4 is a side view of the bobber system for fishing poles 10, according to a preferred embodiment of the present invention; and, FIG. 5 is a top view of the bobber system for fishing poles 10, according to a preferred embodiment of the present invention; and, FIG. 6 is a bottom view of the bobber system for fishing poles 10, according to a preferred embodiment of the present invention.
Figure 3:
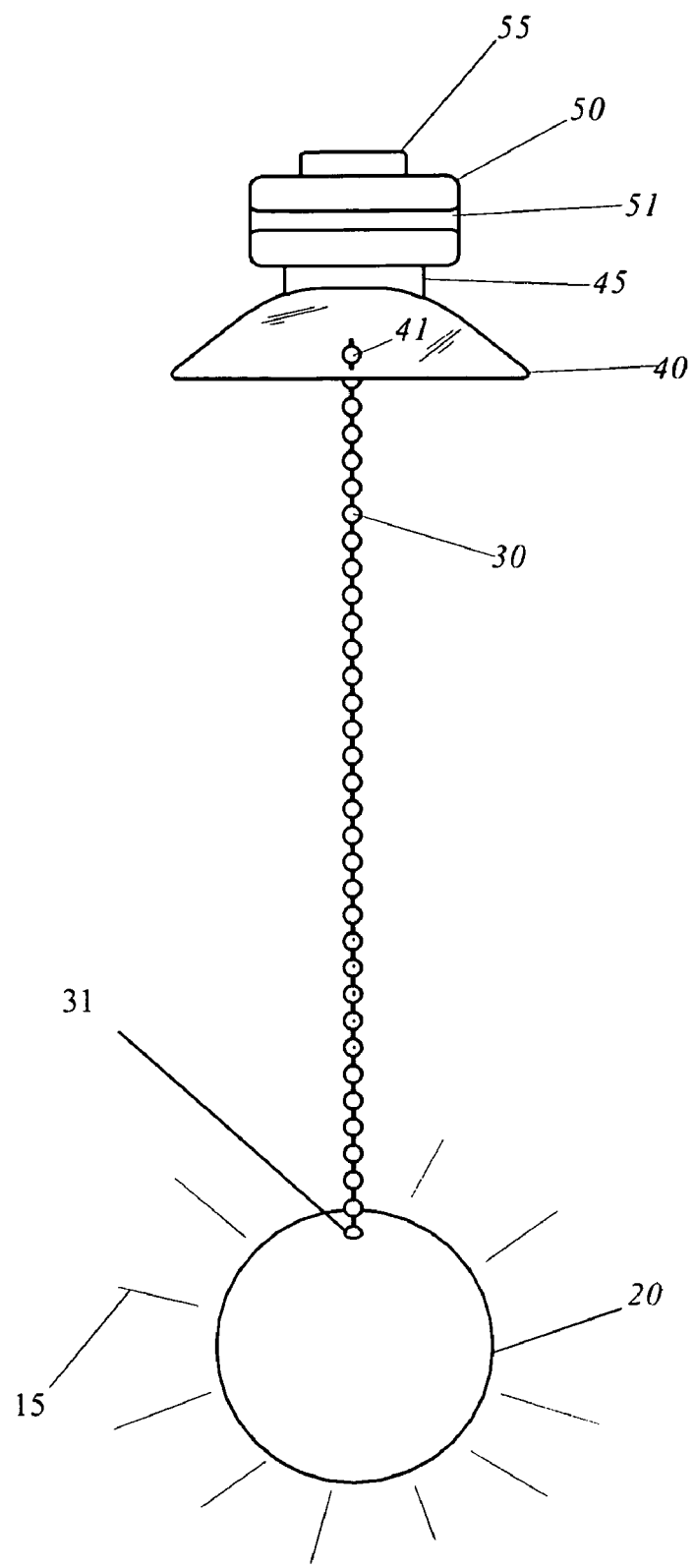

Referring next to FIGS. 2 and 3, a rear and front view, respectively, of the bobber system for fishing poles 10, illustrates the attachment means for the chain 30 or chains to the bobber 20. In the case of a single chain 30, the chain 30 is fed through a chain guide hole 21 of the bobber 20. In the case of two discrete chains, one bottom end of each chain is attached to the opposite ends of the bobber 20 at an intermediary vertical location and perpendicular to the fishing line 70 so as not to interfere with the actions of the line 70 and pole 60.

Figure 4:
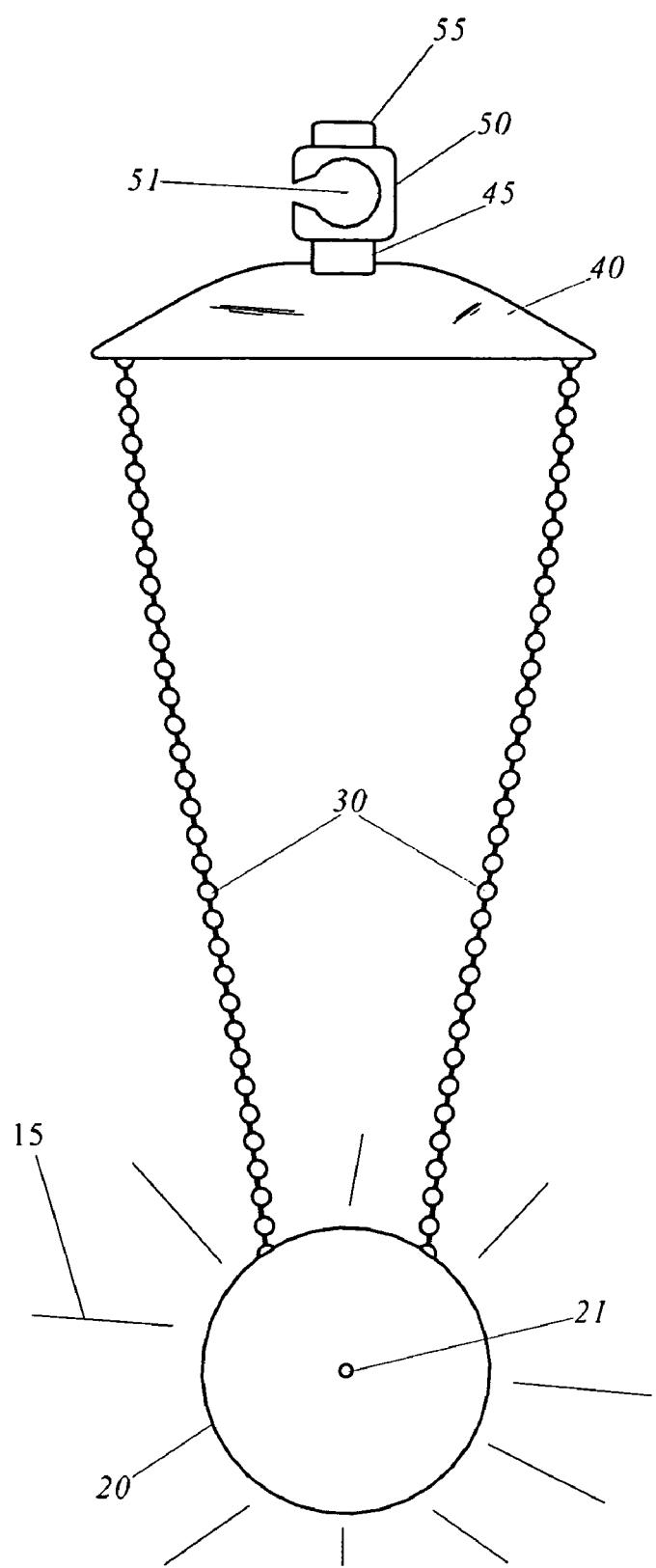

Referring now to FIG. 4, a side view of the bobber system for fishing poles 10, one can readily see the guide holes 21 through which the line 70 is fed through when retaining the bobber 20 on the line 70. Also, the clamp channel 51 diameter is illustrated, which is preferably slightly larger in diameter than a conventional pole 60

Figure 5:
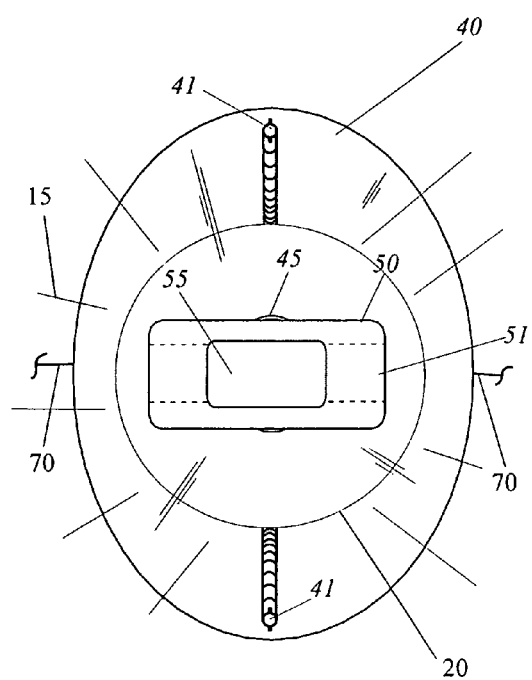

Referring to FIG. 5, a top view of the bobber system for fishing poles 10, one can see the preferable attachment means for the chain 30 to the shield 40. Each end of the chain 30, or one end in the case of a two-chain assembly 30, is fed through a narrow slit 41 on diametrically opposite sides of the shield 40, wherein gravity or friction will retain the ends of the chain 30 within the slit 41.

Figure 6:
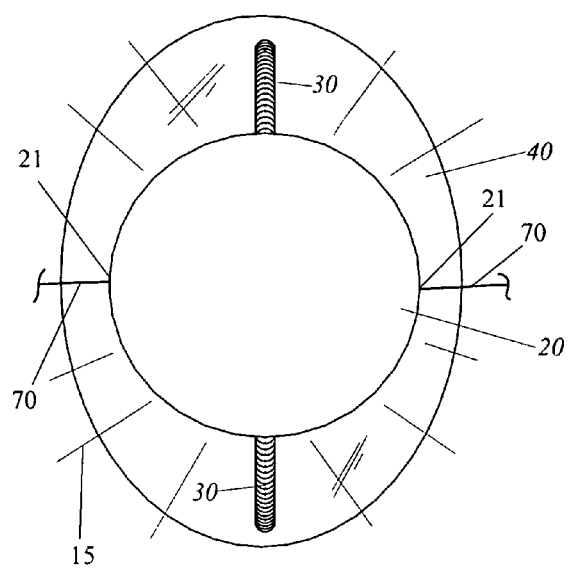

Referring finally to FIG. 6, a bottom view of the bobber system for fishing poles 10, further illustrating the bobber 20, chain assembly 30, and shield 40. It is evident here that the bottom portion of the shield has a circumference slightly greater than that of the bobber 20, particularly useful to prevent the bobber 20 and attached line 70 from wrapping or otherwise entangling themselves around the pole 60.

The preferred embodiment of the present invention is designed to be used by the common consumer, with little or no special skills or prior experience or training necessary. After procurement of the bobber system 10, the user strings the line 70 through the guide holes 21 on the bobber 20 prior to stringing the line 70 through the eyelets of the pole 60. Once the bobber 20 is strung on the line 70 to a pre-determined place on the line 70, the user then secures the clamp 50, with the shield 40 affixed thereto, to the pole 60 directly across from the position of the bobber 20 on the line 70. The chain 30 effectively secures the bobber 20 to the clamp 50. When the bobber system 10 is properly secured to the pole 60 and line 70 the shield 40 eliminates the possibility of any entanglement when the line 70 is pulled taut during the act of fishing. The tautness of the line 70 also ensures that the bobber 20 reliably indicates when a strike on the line 70 occurs.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A fishing bobber system comprising:
   a bobber impregnated with light emitting material suspended on a fishing line by means of feeding said fishing line through guide holes on said bobber;
   a chain assembly to secure the bobber on a shield during stress at the time of fishing, said shield prevents line entanglement during fishing;
   a clamp mechanism for securing the shield, chain assembly, and bobber to a fishing pole; and,
   two discrete chains, each with a first end attached to a bottom end of said shield diametrically opposite from each other and each with a second end attached to an intermediary location on said bobber across from each other.

2. A fishing bobber system comprising:
   a clamp mechanism secured to a fishing pole;
   a shield fixedly secured to said clamp mechanism;
   a bobber releasably attached to a fishing line;
   a chain assembly for attaching said bobber to said shield; and,
   a chain of a single length attached at a first distal end to a location on a bottom end of said shield, fed through a chain guide hole of said bobber, and attached at a second distal end to said bottom end of said shield, diametrically opposite from attachment point of said first distal end.

3. The clamp mechanism of claim 1 or claim 2, further comprising a clamp tab for assisting in attaching said clamp mechanism to said fishing pole by spreading a first bifurcated arm away from a second bifurcated arm so that said clamp mechanism can engage said fishing pole, and subsequent release so that said first bifurcated arm and said second bifurcated arm can move towards each other to encompass and secure said clamp mechanism to said fishing pole.

4. The bobber of claim 1 or claim 2, further comprising: guide holes for receiving said fishing line for securement of said bobber to said fishing line.

\* \* \* \* \*